United States Patent [19]
Debortoli et al.

[11] 3,969,580
[45] July 13, 1976

[54] LOADING COIL ASSEMBLIES FOR COMMUNICATIONS CABLES

[75] Inventors: George Debortoli; Peter McGivery Chase, both of Ottawa; Helmut H. Lukas, Carleton Place, all of Canada

[73] Assignee: Northern Electric Company Limited, Montreal, Canada

[22] Filed: Sept. 22, 1975

[21] Appl. No.: 615,773

[52] U.S. Cl. .................................. 178/46; 336/65; 336/90; 174/70 R
[51] Int. Cl.² .................................. H01F 17/08
[58] Field of Search ............... 178/45, 46; 336/65 R, 336/90 R, 185; 174/70 R; 333/1

[56] References Cited
UNITED STATES PATENTS

| | | | |
|---|---|---|---|
| 1,103,130 | 7/1914 | Horner et al. | 178/45 |
| 1,768,240 | 6/1930 | Falk | 178/46 |
| 3,134,854 | 5/1964 | Martin et al. | 178/46 |
| 3,691,294 | 9/1972 | Charles | 178/46 |
| 3,838,213 | 9/1974 | Georgopulos et al. | 178/46 |
| 3,845,435 | 10/1974 | Georgopulos | 336/65 |
| 3,865,980 | 2/1975 | Moser et al. | 333/1 |

Primary Examiner—Saxfield Chatmon, Jr.
Attorney, Agent, or Firm—Sidney T. Jelly

[57] ABSTRACT

A loading coil assembly comprises a casing having discs at each end. At the inlet end a support disc is mounted on and spaced from the end disc and a plurality of assembled magazines holding loading coils is attached at one end of each magazine to the periphery of the support disc. A similar support disc interconnects the other ends of the magazines, the magazines extending in a circle about the casing axis. Further circles of magazines can be added by providing one or more annular rings attached to the end disc carrying the support disc, for attachment of the magazines at one end, and also interconnecting the other ends of the additional circles of magazines by annular rings. The conductors can be fed along spaces between adjacent magazines. The casings vary in size according to the number of circles of magazines.

15 Claims, 20 Drawing Figures

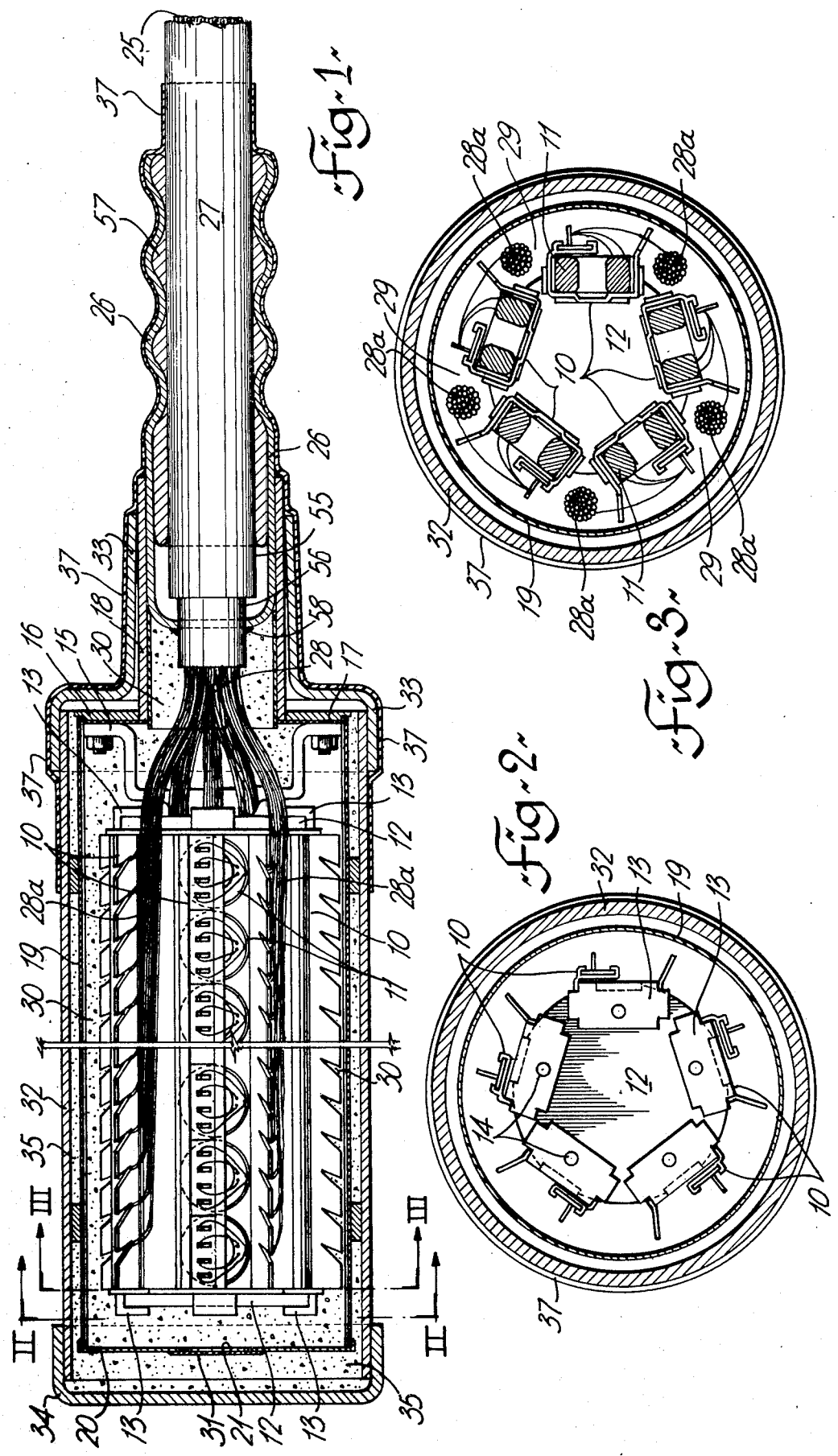

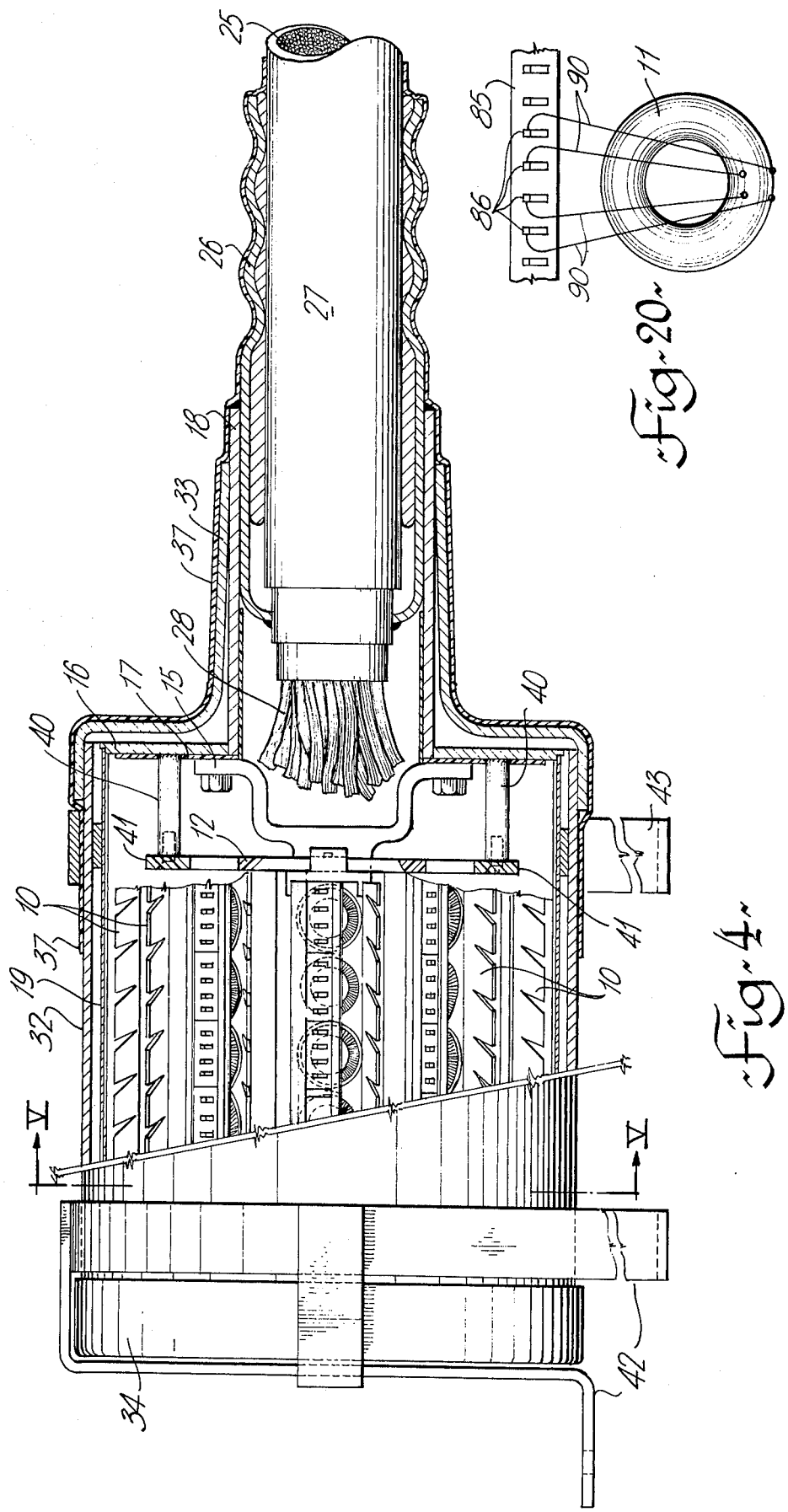

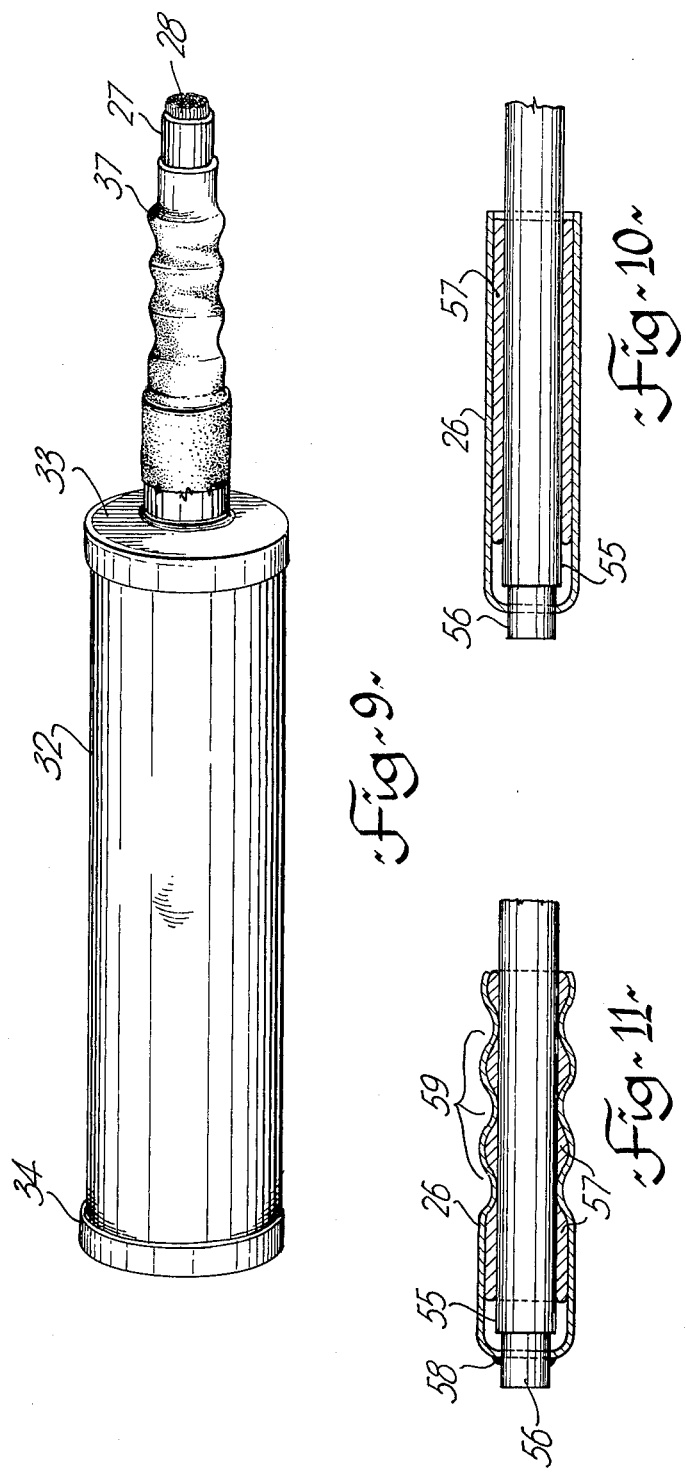

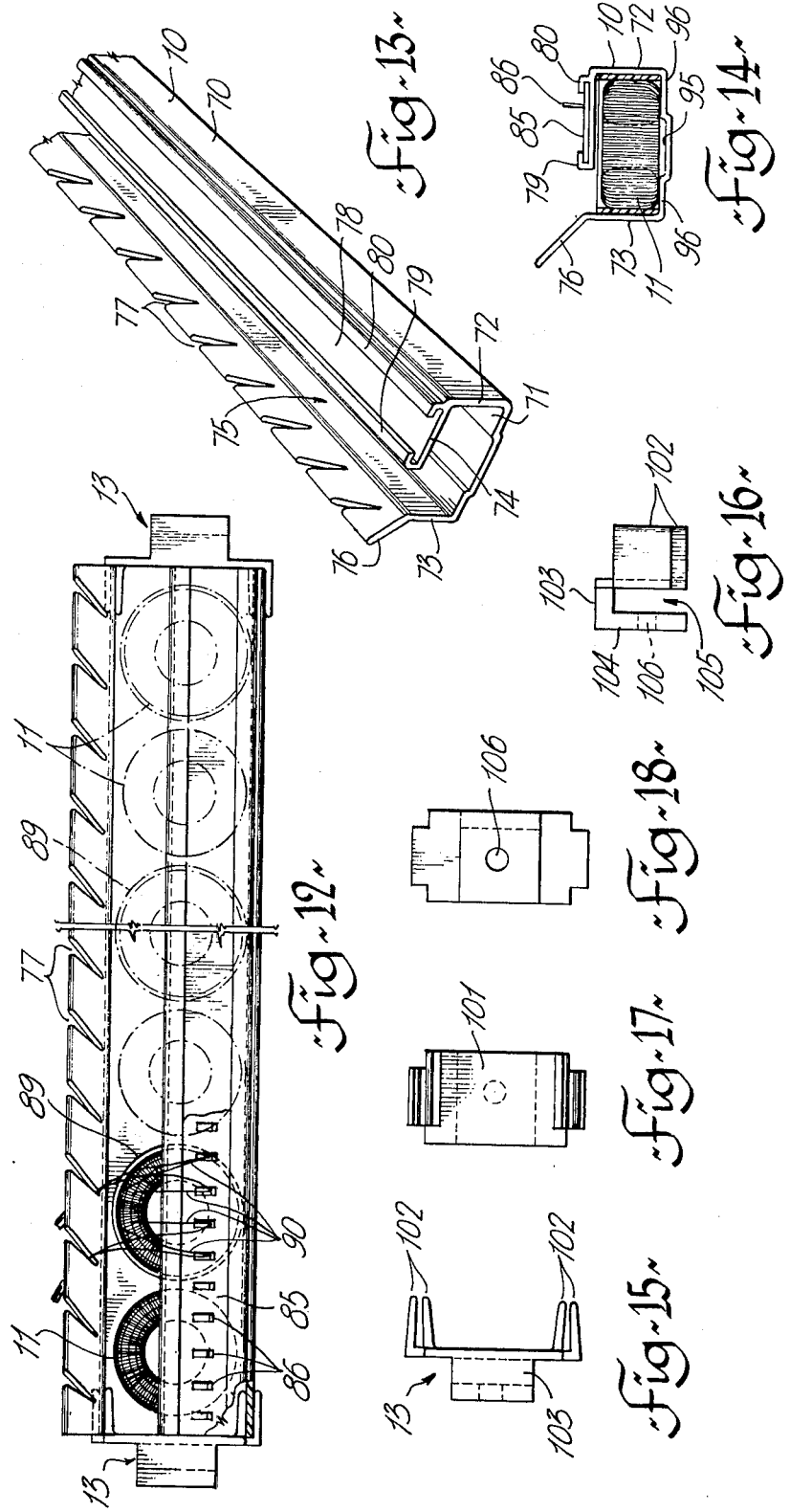

LOADING COIL ASSEMBLIES FOR COMMUNICATIONS CABLES

This invention relates to loading coil assemblies, for communications cables, particularly but not exclusively for telephone cables.

Loading coils, assembled into casings or housings, are positioned at predetermined positions along a cable to maintain desired transmission characteristics. Previously, loading coils have been assembled in casings or housings with their axes coaxial or in parallel planes. Thus, for example, coils may be stacked on dowels with the axes of the coils coaxial. In an alternative arrangement coils are positioned in shaped recesses in discs — usually of molded plastic, with the discs mounted in superposed position.

Care is taken to ensure that the beginnings and ends of adjacent coils are not adjacent, but are displaced to provide separation. Also vertical separation is necessary. This is to prevent or at least substantially reduce, cross-talk. As a result assemblies of coils are quite large. Further, attachment of the wires from the coils cannot usually be done until assembly into the supporting framework of the casing.

The present invention provides a more compact arrangement. In previous casings a central access hole was provided for feeding the telephone cable pairs up to the coils and back from the coils. This hole was of a diameter equivalent to the diameter of the cable — which is quite large for cables housing a large number of pairs. Each casing was built for a particular cable size and all items were specific to that size. The support structures, for example was specifically designed for each size of casing. As a result a large variety of items are required to provide for all the different cable sizes.

In the present invention, by fanning out the cable pairs at the base of the housing, no central access hole is required. The pairs of conductors are fed up to the coils, and back down from the coils in the space necessarily provided alongside the coils. Further, coils are premounted in magazines, the magazines being attached to mounting rings or discs at top and bottom only. The magazines can be of one of a predetermined number of alternate lengths, and conveniently can be formed from extruded material. The magazines can be mounted in concentric circles and thus varying capacities can readily be built up.

The invention will be readily understood by the following description of various embodiments, by way of example, in conjunction with the accompanying drawings, in which:

FIG. 1 is a longitudinal cross-section through one form of loading coil case having one circle of magazines;

FIGS. 2 and 3 are cross-sections on the lines II—II and III—III respectively of FIG. 1;

FIG. 4 illustrates a loading coil case, partly in longitudinal cross-section, having two circles of magazines;

FIG. 9 is an external view of a loading coil case, illustrating the cable connection to the case;

FIGS. 10 and 11 are longitudinal cross-sections illustrating stages in the making of the connection between cable and case;

FIG. 12 is a plan view of one form of loaded magazine;

FIG. 13 is a perspective view of an extrusion for a magazine as in FIG. 12;

FIG. 14 is an end view of the magazine in FIG. 12, with end cap removed;

FIGS. 15, 16, 17, 18 and 19 are respectively plan view, side view, end view, front view and perspective view of an end cap for the magazine of FIG. 12;

FIG. 20 is an extended plan view of illustrating the attachment of the wires from the coils to the terminal strip.

Figure 5:
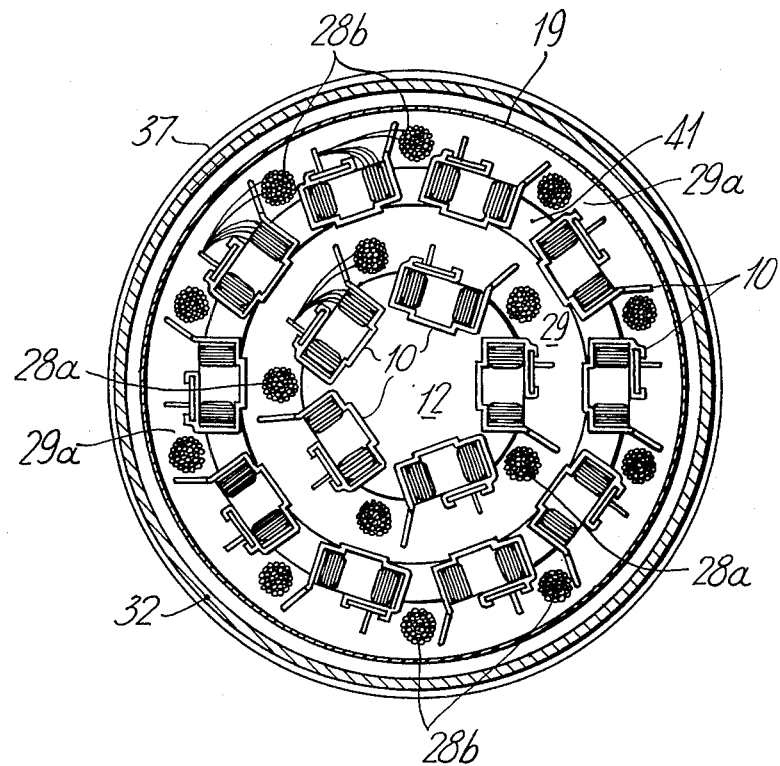
FIG. 5 is a cross-section on the line V-V of FIG. 4.

As illustrated in FIGS. 1, 2 and 3, a loading coil case comprises a plurality of magazines 10 each magazine holding a plurality of loading coils 11. One form of magazine will be described later. The magazines 10 are supported at each end on a support member in the form of a disc 12. The magazines are arranged in the present example, in a single circle, and are mounted on the discs by means of end caps 13 which clip over the edge of the disc. Each end cap 13 has a web spaced from the main portion of the cap to form a groove or channel in which fits the disc 12. Conveniently, the web of each end cap has a hole 14 and a projection on the surface of the disc enters the hole. Thus the end caps 13 are both positioned and held on the discs 12.

At the lower end of the case, the disc 12 is secured to a support bracket 15 which in turn is bolted to a metal end disc 16. An insulating disc 17 is positioned between bracket 15 and end disc 16. End disc 16 has a central aperture and is secured, as by welding, to an inlet tube 18. The periphery of the end disc 16 carries a first inner casing 19, casing 19 being soldered to disc 16 and also has a further disc 20 at the upper end soldered thereto. Disc 20 has a central aperture 21.

The cable 25 enters the inlet tube 18, a lead sleeve 26 being formed onto the end of the cable sheathing 27, as will be described in more detail later. The conductors 28 of the cable are split into a number of separate bundles 28a, a bundle extending up in each channel 29 formed between two adjacent magazines 10.

After loading of the magazines onto the support members and insertion into the inner casing 19, the inner casing is soldered to the end disc 16 and the whole is filled with an expanding plastic material 30 through the aperture 21, after which the aperture 21 is closed by a disc 31. The assembly is then placed in an outer plastic casing 32 bonded or welded at the lower end to a further tube 33. The space between the inner casing 19 and outer casing 32 is also filled by expanded plastic material 35, through the open upper end and afterwards closed by cap 34. The outer bottom portion of the casing to the cable entrance position is then enclosed in a tube of heat shrink plastic 37.

FIGS. 4 and 5 illustrate a loading coil case in which two concentric circles of magazines 10 are mounted in the case. Corresponding reference numerals are used for corresponding items in FIGS. 4 and 5, as in FIGS. 1, 2 and 3. The inner circle of magazines is mounted exactly as in FIGS. 1, 2 and 3. However a larger end disc 16 is provided and in addition to the bracket 15, disc 16 carries a number of standoffs 40 — for example four. Standoffs 40 support a ring 41 onto which are clipped the outer circle of magazines. The ring 41 has projections which enter the holes 14 in the webs of the end caps 13.

At the top end the inner circle of magazines are mounted on a disc, as in FIG. 1, and the outer circle of magazines are mounted on a ring which is of the same form as the ring 41 at the lower end. However, at the upper end, the ring, as is also the disc, is not supported from the casing but acts as a locating and support member by its engagement with the upper ends of the magazines.

The inner and outer casings 19 and 32 are of course larger, and the spaces are again filled with expanded plastic and outer plastic sheath 37 is also provided. A larger cable 25 is accommodated and the conductors 28 are divided up into two sets of bundles — 28a and 28b. The bundles are positioned between adjacent magazines in channels 29 and 29a. Also shown in FIG. 4 are mounting brackets 42 and 43 for attachment of a case to a support structure.

Figure 6:
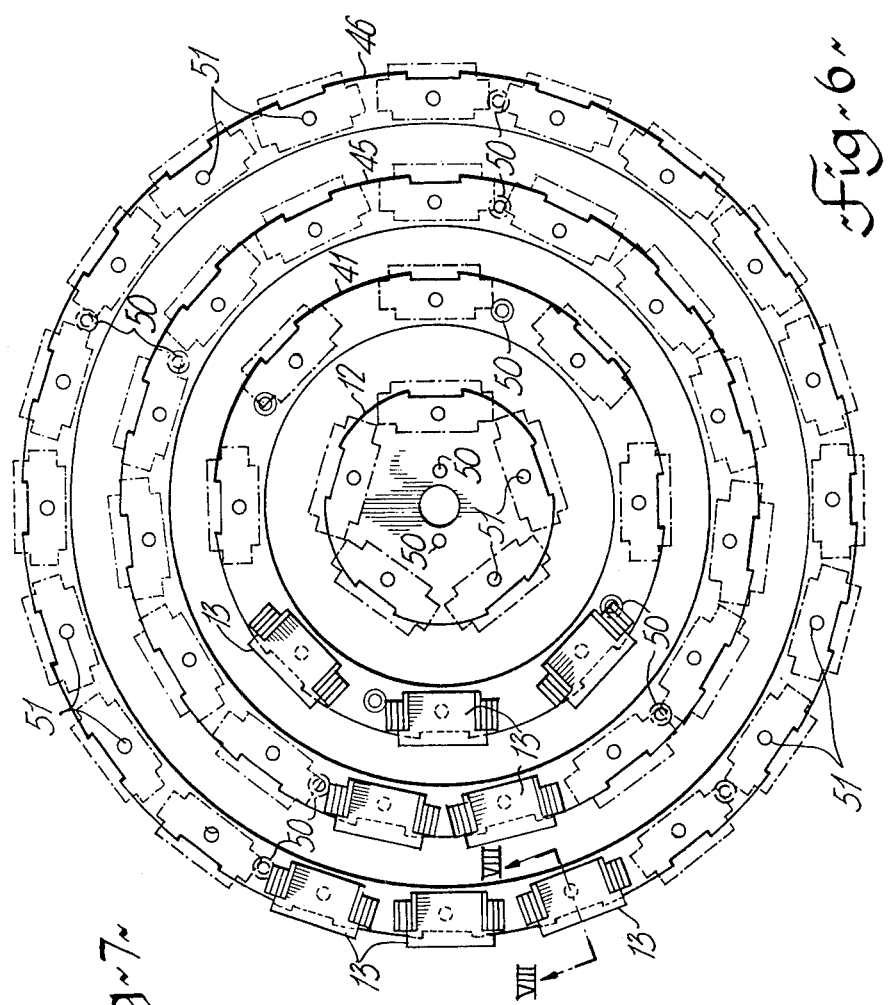
FIG. 6 is an end view illustrating the positioning of the concentric support member for a four circle assembly.
Figure 7:
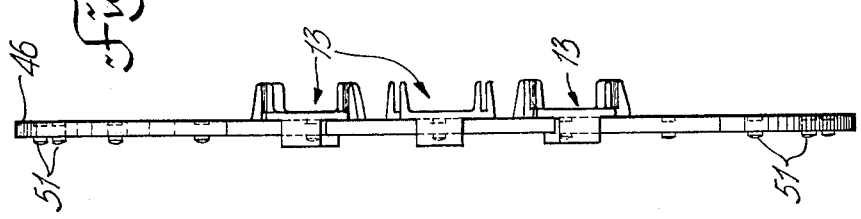
FIG. 7 is a side view of the support members in FIG. 6, with some end caps in position.
Figure 8:
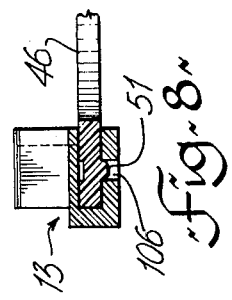
FIG. 8 is a cross-section on the line VIII—VIII of FIG. 6.
Figure 19:
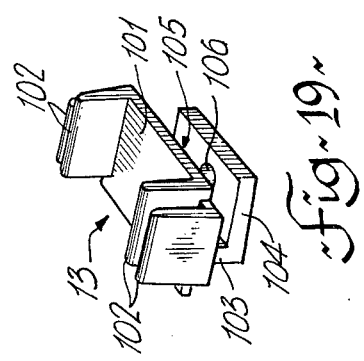

FIGS. 6, 7 and 8 illustrate the arrangement of concentric discs and rings as used at each end of an assembly for a four circle case. As particularly seen in FIG. 6 there is the disc 12, as in FIGS. 1 and 4, a first ring 41 as in FIG. 4, and then two further rings 45 and 46. The same arrangement is used for both ends of an assembly and conveniently the discs 12 and rings 41, 45 and 46 can be identical at both ends, although only those at the lower end will be mounted on supports carried by the end disc 16 — FIGS. 1 and 4. Holes 50 in the disc 12 and rings 41, 45 and 46 are shown, the disc 12 mounted on the bracket 15 — FIGS. 1 and 4 and the rings 41, 45, and 46 mounted on standoffs — as 40 in FIG. 4 — at the lower end. At the upper end the discs and rings are connected to the end caps of the magazines to provide location and support. Projections 51 are shown on the rings and the disc, thus projections entering the holes 14 in the webs of the end caps. A number of end caps 13 are shown in position on the rings 41, 45 and 46. FIG. 8 illustrates, by cross-section, the interengagement between a projection 51 and a hole 14.

Thus the number of different items to be stacked to provide for different sizes of loading coil cases is very much reduced, compared with previous forms of cases, with many of the items common to all cases.

In addition to providing protection against the environment and preventing damage to the coils, a case must make a satisfactory connection with the stub cable. The sizes of a stub cable can vary, the occurrence of out-of-roundness, and lack of concentricity of the cable core, metal sheath and outer sheath all create difficulties in obtaining a satisfactory attachment and sealing of the case to stub cable.

As illustrated in FIGS. 1 and 9, the case has the cable 27 entering at one end, for convenience referred to as the lower end, via the inlet tube assembly 18 and 33. It is essential that the mechanical and electrical connection between cable and case be of very high quality. If the mechanical connection is not strong, cracking can occur due to relative movement between case and cable.

As seen in more detail in FIG. 1, cable 27 has the outer protective sheath 55 removed at one end to expose a short length of the metal sheath 56. The metal sheath 56 in turn has been removed to expose lengths of the conductors 28 of the cable for fanning out and passage up through the case for connection to loading coils.

Lead sleeve 26 is crimped onto the outer sheath 55 over a layer of sealing tape 57. The inner end of the lead sleeve 26 is soldered to the metal sheath 56 of the cable, at 58. The outer end of the lead sleeve is sealed to the end of the outer coating or sheathing 55 of the cable by sealing tape compound, and an overlay of heat shrinkable plastic sheathing 37.

FIGS. 10 and 11 illustrate two stages in preparing the end of the stub cable for attachment of the loading coil case. As seen in FIG. 10 the outer sheathing 55 has been removed to expose the metal sheath 56. A layer 57 of sealing tape, for example of an elastomeric material, is placed on the metal sheath 56. This layer 57 is made up of one or more wrappings of sealing tape. The lead sleeve 26 is then positioned over layer 57. The cable end is then as in FIG. 10.

The lead sleeve 26 is crimped to the cable end by circumferentially extending crimps 59. The sealing compound is compressed within the wings, providing a pressure seal and mechanical stability between the cable and lead sleeve. The end of the lead sleeve is then soldered at 58 to the metal sheath 56. Sealing compound expands out of the other end of the lead sleeve 26 to seal the cable 27.

The heat shrinkable plastic sheathing 37 is then applied over the lead sleeve, adjoining cable and bottom end of the casing. This provides an additional seal, corrosion protection at the position where the lead sleeve meets the metal tube 18, and an aesthetic finish.

By varying the thickness of the layer of sealing tape 57 and by varying the depth of the crimps 59 one size of tube 18 can accommodate varying sizes of cable.

The assembly provides a strong mechanical joint or attachment. The length of the tube 18 and its engagement with the lead sleeve provide a high strength connection between cable and case, while the layer 16 provides flexibility which avoids cracking. The end cap 28, with its tubular extension 28 engaging over the tube 19 also adds mechanical strength.

FIGS. 12 to 20 illustrate a form of coil magazine in more detail. The magazines can be preassembled with the loading coils, with the coils wired to terminal strips, and with the coils orientated to avoid magnetic field interference. The loading coils are placed in a magazine which comprises a length of extruded, or molded material, plastic material generally the length of the magazine being variable to accommodate differing numbers of coils. Terminal strips are held in a formation on the magazine, and end caps fit on each end to retain the coils in position and also to serve as mounting means for the magazines.

As seen in FIG. 13, the main body 70 of a magazine 10 is in the form of an extrusion having a modified channel-shaped cross-section. Thus there is a base web 71, two parallel side webs 72 and 73 and an inwardly extending top web 74 extending from the top edge of side web 72 towards side web 73. Top web 74 extends only part way across the body 70 to leave an access slot 75. At the top edge of the side web 73 extends an outwardly inclined web 76. Inclined slots 77 are formed in web 76 which acts as a fanning strip for the cable pairs.

The top surface of top web 74 is shaped to provide a shallow channel 78 with inturned edges 79 and 80. Terminal strips 85 (FIG. 12) slide into the shallow channel 78 from the end of the body 70. Conveniently each terminal strip has four terminals 86 and serves for one coil. If desired longer terminal strips could be used with more than four terminals. Also the terminals could be mounted by some other arrangement for example ultrasonically inserted directly to the top surface of the web.

The arrangement of coils 11 and terminal strips 85 is seen in FIGS. 12 and 14, coils 11 being shown in the main body 70, together with associated terminal strips 85. Each alternate coil is surrounded by a plastic sleeve 89. Attaching of the wires 90 from the coils 11 to the terminals 85 to a large extent prepositions the coils so that the beginnings and ends of the windings, which are at the positions at which the wires 90 extend from the coil, as seen in FIG. 9 are not adjacent to each other in adjacent coils. This positioning prevents excessive magnetic coupling between adjacent coils. Generally the coils 11 are positioned as illustrated in FIG. 12. The conductors from the cable are indicated at 91.

The coils are a fairly close fit in the main body 70 and are slid in from one end. To reduce friction between coils and the base web 71 this is shaped to have a recessed centre portion 95 and raised side portions 96, although this is not essential. This is seen quite clearly in FIG. 14. The recessed portion also allows for a rear entrance slot to the coils when potting the coils with a polyurethane type filler compound.

The coils can be fed in from both ends of the body 10 or only from end, as desired. If the magazine is of flexible material, the coils can also be inserted via the longitudinal opening. End caps 13 are fitted on each end of the body to retain the coils in position and to provide attachment means for the magazine. In FIG. 12 an end cap is shown on each end.

FIGS. 15 to 19 illustrate an end cap 13 in more detail. Basically an end cap comprises a channel shaped member having a base web 101 and a pair of closely spaced webs or legs 102 on each side. The webs or legs 102 of a pair are spaced apart so as to be a push fit on one of the side webs 72 and 73 of the body 10. The pairs of webs or legs are spaced so that each pair cooperate with a related side web 72 or 73. Extending from one edge of the base web 101, referred to as the top edge for convenience, is a short web 103. Web 103 extends in the opposite direction to the webs or legs 102 and at its end is a further web 104 extending parallel to and spaced a short distance from the base web 101. There is thus provided a slot 105 which provides a means for attaching magazines to the discs 12, and also rings 41, 45 and 46 (FIGS. 1, 4 and 6). A hole 106 is formed in the web 104 for cooperation with a protrusion on the support structure.

After assembly of the coils into a magazine, attaching of end caps 13 and soldering or otherwise connecting wires 90 to the terminals 85, there is provided a compact assembly for attachment to a support structure of a casing. The connection of the wires 30 to the terminals is done at the magazine assembly stage. With the coils positioned side-by-side, with their axis perpendicular to the assembly plane, there is only line contact between coils, and even here there is slight separation by the plastic sleeve 89. Thus cross-talk is reduced to a minimum. Also, as described above, the connecting of wires 90 to the terminals 86 on the terminal strips 85 — with the offset positioning of the terminal strips relative to the coil axes, tends to ensure that the coil winding starts and ends of adjacent coils are spaced apart from each other.

The number of coils per magazine can be varied, as stated, by variation of the length of the body 10. As described, a varying number of magazines can be mounted in a casing and it is possible to provide for a considerable variation in number of coils by varying the length of a magazine and the number of magazines in a casing. It has been found convenient, for example to provide four different lengths of magazines and three different casing sizes, that is three different number of magazines.

It has been found convenient also to provide for two different coil sizes, one for suburban use and a larger coil for rural areas where conditions of service can be more severe. For the larger coils, magazines having a larger cross-section are used. The same alternative magazine lengths are provided — holding fewer coils, and the number of magazines per casing are reduced to use the same casing sizes as for the smaller coils.

What is claimed is:

1. A loading coil assembly, comprising:
   an inner casing including first and second end discs, a disc at each end of the casing;
   a first support disc mounted on said first end disc and spaced axially therefrom in said casing;
   a plurality of assembled loading coil magazines in said casing, said magazines extending axially and spaced circumferentially around the axis of said casing, mounting means at each end of each magazine, the mounting means at one end of each magazine engaging with the periphery of said first support disc;
   a second support disc adjacent to said second end disc, said mounting means at the other end of each magazine engaging with the periphery of said second support disc;
   cable entry and attachment means, attached to said first end disc;
   a further casing enclosing said inner casing and spaced therefrom; and
   expanded synthetic resin electrically insulative material filling spaces in said inner casing and between said inner casing and said further casing.

2. An assembly as claimed in claim 1, further including a heat shrinkable plastic sheath over said cable entry and attachment means and over at least that part of the further casing adjacent to said cable entry and attachment means.

3. An assembly as claimed in claim 1, further including:
   a plurality of standoffs attached to said first end disc;
   a ring supported on said standoffs, said ring entering circumferentially around said first support disc and spaced radially therefrom;
   a further plurality of assembled loading coil magazines supported at one end of said ring;
   a further ring extending circumferentially around said second end disc and spaced radially therefrom, said further plurality of assembled loading coil magazines supported at their other ends on said further ring.

4. An assembly as claimed in claim 1, further including:
   a plurality of rings supported from said first end disc, and surrounding said first support disc;
   a plurality of assembled loading coil magazines supported at one end of each magazine on each of said rings;
   a further plurality of rings surrounding said second support disc, the assembled loading coil magazines supported at their other ends on said further rings.

the magazines positioned in a series of concentric circles about the axis of the loading coil assembly.

5. An assembly as claimed in claim 4, said rings and said first support disc in a common plane.

6. An assembly as claimed in claim 4, said further rings and said second support disc in a common plane.

7. An assembly as claimed in claim 1, each of said loading coil magazines comprising:
a body member of a length of preformed electrically insulated material having a channel shaped cross section including a base web, two spaced apart side webs extending from said base web, and a top web on an upper part of a first one of said side ends, said top web extending inwardly over and spaced from said base web;
at least one terminal strip on said top web and including terminals thereon;
a plurality of loading coils positioned side by side in said body member, the axes of said coils parallel and extending normal to said base web, each end of the winding of the coil attached to a related terminal;
an end cap on each end of said body member, each end cap including an outwardly extending formation for engagement with a support structure.

8. A loading coil assembly as claimed in claim 7, including a further web at the top of a second one of said side webs, said further web extending in a direction away from said base web, and slots in said further web, said slots adapted for the acceptance of conductors for attachment to said terminals.

9. A loading coil assembly as claimed in claim 7, including an insulating sleeve around at least each alternatie coil.

10. A loading coil assembly as claimed in claim 7, said top web including inturned edges to define a shallow channel cross-section, said terminal strip being sliding fit in said channel.

11. A loading coil assembly as claimed in claim 7, said terminal strip extending the full length of said body member.

12. A loading coil assembly as claimed in claim 7, including a plurality of terminal strips, a strip for each coil.

13. An assembly as claimed in claim 1, said cable entry and attachment means comprising:
an inlet tube attached to said first end disc and extending axially therefrom;
a cable end entered into said inlet tube, the cable end including a metal sheathing around the conductors of the cable and a protective sheathing around said metal sheathing;
said metal sheathing removed at said cable end for a length to expose the conductors, the conductors entering the casing and connected to said loading coils in said case;
said protective sheathing removed to expose a short length of the end of said metal sheathing, the ends of said metal sheathing and said protective sheathing positioned within said tube;
a layer of sealing compound over said protective sheathing;
a lead sleeve over said layer of sealing compound and extending part way over said exposed length of said metal sheathing and crimped onto said cable end, an end of said sheathing soldered to said exposed length of metal sheathing.

14. An assembly as claimed in claim 7, said further casing including an end cap on an inner end of said further casing, said end cap including a tubular extension extending over said tube extending from said end plate.

15. An assembly as claimed in claim 14, said heat shrinkable plastic sheathing extending over said lead sleeve, said end cap and said tubular extension of said end cap.

* * * * *